United States Patent [19]

Warner

[11] 4,236,604
[45] Dec. 2, 1980

[54] START/STOP CONTROL OF CONVEYING MEANS

[75] Inventor: Robert A. Warner, Elgin, Ill.

[73] Assignee: Tri-Tronics Company, Inc., Oak Brook, Ill.

[21] Appl. No.: 25,725

[22] Filed: Mar. 30, 1979

[51] Int. Cl.³ ............................................ G61D 15/00
[52] U.S. Cl. ...................................... 186/61; 186/69; 198/857
[58] Field of Search ....................... 186/59, 60, 61, 69; 198/857

[56] References Cited

U.S. PATENT DOCUMENTS

| 1,985,563 | 12/1934 | Fitzgerald | 198/857 |
| 3,819,012 | 6/1974 | Beck et al. | 186/61 |
| 4,138,000 | 2/1979 | Hartup | 186/61 |

Primary Examiner—Joseph J. Rolla
Attorney, Agent, or Firm—Keil & Witherspoon

[57] ABSTRACT

A start/stop control arrangement for material handling systems, particularly automated checkout systems in retail stores. From a beam sensing device at the delivery end of the incoming conveyor a control is derived not only for stopping the conveyor in response to the detection of the arrival at that end of a product but also a time control for automatically stopping the conveyor in response to no such product being detected by that device for a predetermined time. The arrangement may be incorporated in the amplifier unit which serves to amplify the output of the beam of the beam sensing device. Alternatively, and as shown herein, the arrangement may be implemented by a plug-in accessory module designed to be interposed between two cooperating plug-in modules—one of them mounting the above sensor amplifier—which provide for the first of these two controls only. Provisions are also made for double-using the arrangement for the start/stop control of the conveyor outgoing from the checkout stand.

8 Claims, 9 Drawing Figures

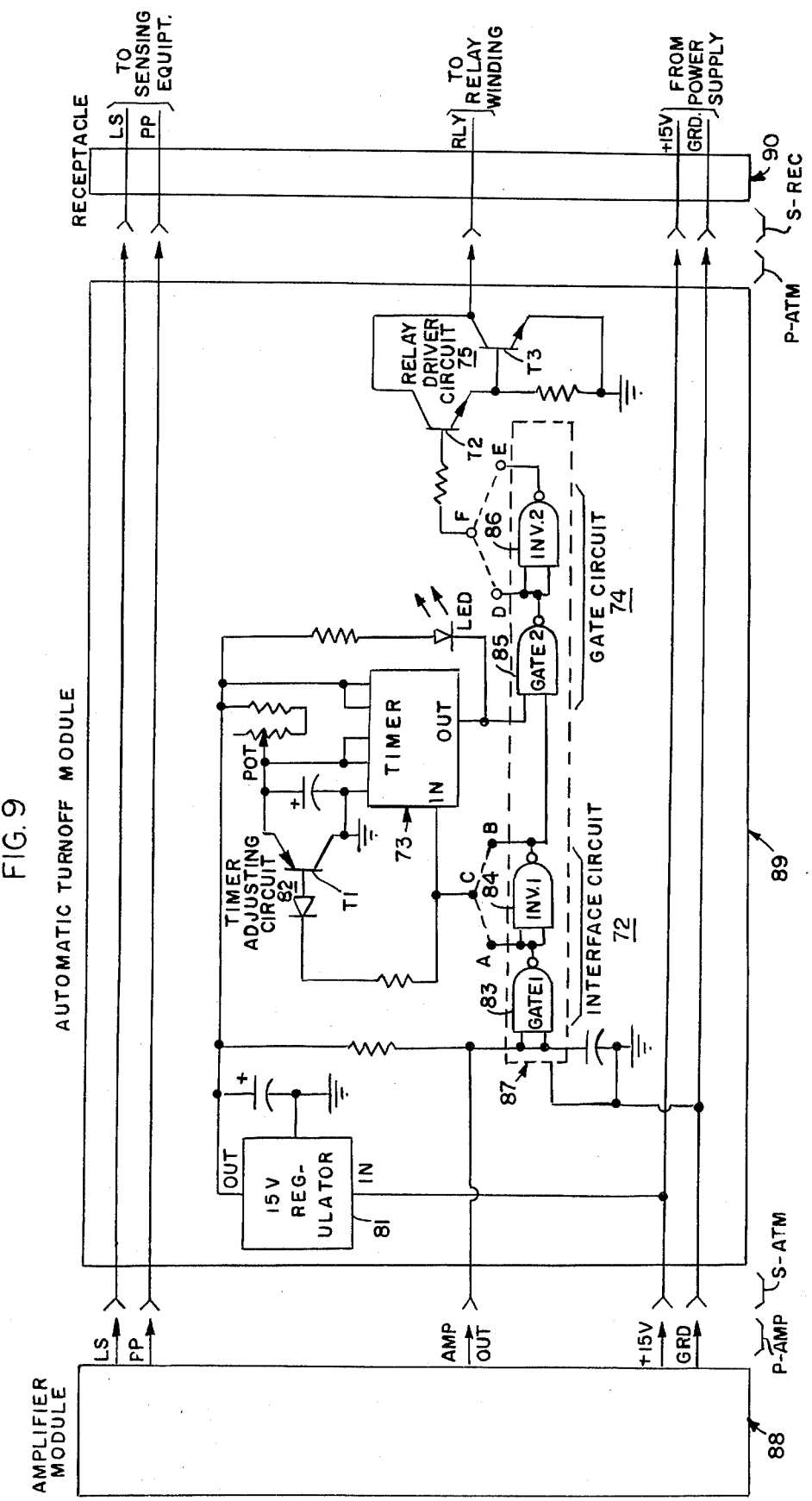

START/STOP CONTROL OF CONVEYING MEANS

BACKGROUND OF THE INVENTION AND PRIOR ART

The invention relates to the start/stop control of conveying means in material handling systems.

While the invention is applicable to material handling systems of various kinds, including, for example, luggage checkin systems in airports or bus terminals, the preferred application of the invention is in connection with automated checkout systems in retail stores, particularly grocery stores or super markets, and it will hereinafter be described as applied to such systems. The conveying means are preferably in the form of conveyor belts but the invention is of equal merit when applied to turntables or similar conveying apparatus.

In systems of the above type it is known to provide at the delivery end of the incoming conveyor belt, that is, at the end of the belt adjacent the checkout stand proper, a sensing device which responds to the breaking of a light beam by the product first in line arriving at that end to automatically stop the normally operating belt. As the checkout clerk lifts the product from the belt to check it out, the light beam again strikes the scanning device and, as a result, the conveyor belt is restarted. This cycle repeats itself as the product next in line reaches this end of the conveyor belt and so on.

At slack times, when the product "traffic" on the conveyor belt leading to the checkout system is light or becomes non-existent, that is when, at least temporarily, no further products are being placed on the belt by waiting customers, the belt would keep running since the sensing device would cease to detect arriving products. As a consequence there would be unnecessary wear and tear on the belt and its driving equipment and this would be accompanied by a corresponding waste of energy.

OBJECT AND SUMMARY OF THE INVENTION

It is the primary object of the invention to obviate these disadvantages in a simple and efficient manner and without reliance on manual intervention by the checkout clerk or other personnel.

With the foregoing object in mind the invention proposes, briefly, to derive from the sensing device at the delivery end of the conveying means not only a control for stopping the conveying means in response to the detection by the sensing device of an item of material, such as a product for sale in the grocery store, at that end, but also a time control for automatically stopping the conveying means in response to no such item being detected by that scanning device within a predetermined time interval.

In checkout systems the checked out products are frequently packaged at a station separate from the checkout stand proper and in such cases the checked out products are transported from the checkout station to the packaging station by an additional, normally operating conveying means, hereinafter referred to as the outgoing conveying means. In situations of this general kind the aforementioned time control, according to another feature of the invention, is arranged to stop both the incoming and outgoing conveying means responsive to no product being detected within a predetermined time by the sensing device at the delivery end of the incoming conveying means. By thus automatically shutting down also the outgoing conveyor at times when there is no demand for it, the wear and tear of this conveyor and its associated equipment is likewise reduced and the attendant waste of energy and operating expense is obviated.

According to yet another feature of the invention the automatic turn-off control contemplated herein is implemented as an integrated circuit type accessory or adapter module which, by means of a multi-pin plug on its one side and a multi-pin jack on its opposite side, can be, physically and electrically, interposed between the multi-pin plug-equipped sensor amplifier unit and the multi-pin receptacle therefor which latter are directly plugged into each other when the automatic turn-off kind of operation is not needed. Moreover, conversion from the one to the other mode of operation is thereby made possible in a very simple manner. Where the plug-in adapter module arrangement is not desired the automatic turn-off control circuitry can, instead, be incorporated in the sensor amplifier unit.

It may be mentioned here that "off-delay" or "motion" controls providing for the conveyor shutdown in accordance with traffic conditions, have previously been used in industrial product applications. However, these off-delay arrangements of the prior art were provided as separate self-contained controls and they did not provide, as does the invention, for the double use of the same sensing means for stopping the conveyor in response to the detection of the forward item of material arriving at a delivery point and also in response to no such detection being made within a given time.

BRIEF DESCRIPTION OF THE DRAWINGS

Preferred embodiments of the invention will now be described with reference to the accompanying drawings in which:

FIG. 9 is a schematic diagram of the combination of FIG. 8, in which further circuit details of the automatic turnoff circuit according to the invention have been shown.

DESCRIPTION OF PREFERRED EMBODIMENTS

The invention will now be described as applied to automated checkout systems for retail stores, such as supermarkets. The particular kind of system to which the invention is shown applied herein by way of examples is one including an optical scanner located at the checkstand. In the operation of such a system an encoded label on each article of merchandise—or at least on certain of such articles—is sensed as the article, upon its arrival at the delivery or terminating end of the conveyor, is passed by the checkout clerk over the counter surface of the stand. Typically, the scanning equipment is mounted underneath the checkout counter surface and in this manner it projects one or more scanning light beams upwardly thereof through a window in the aforementioned surface so that the encoded information on the lable can be read for evaluation.

Figure 1:
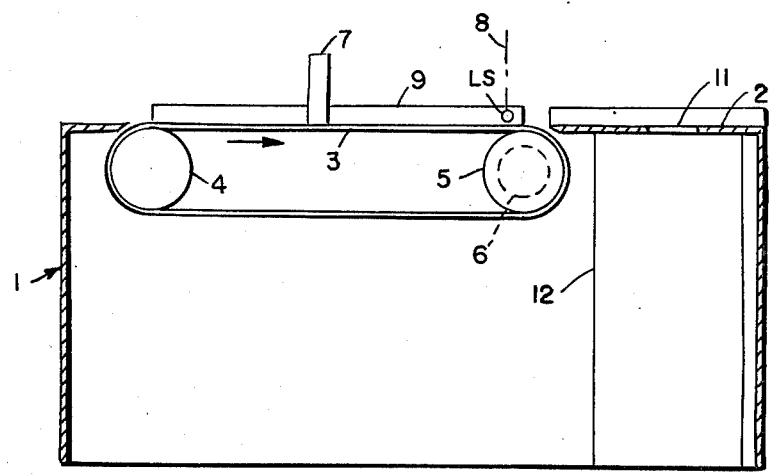
FIG. 1 is a front elevation, in part section, of the automatic checkout stand with the conveyor belt incoming thereto.
Figure 2:
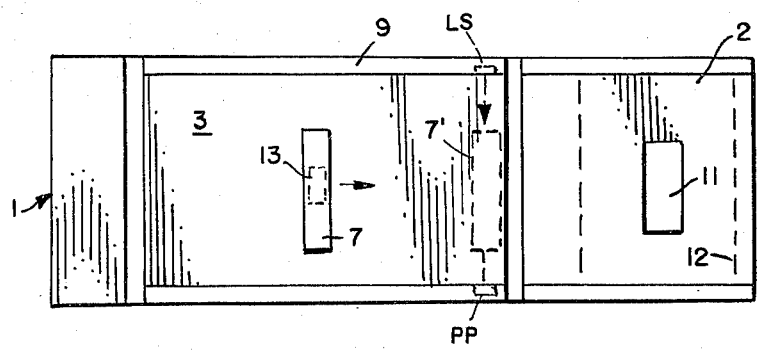
FIG. 2 is a top view of the checkout stand and incoming conveyor belt shown in FIG. 1.
Figure 3:
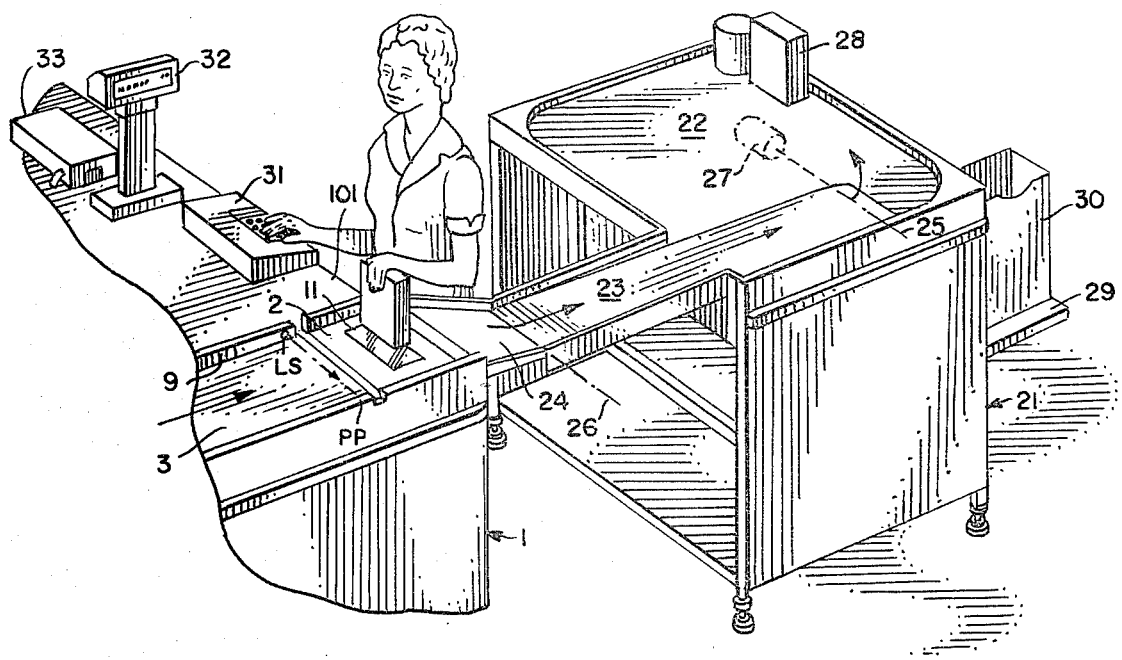
FIG. 3 is a perspective view of the checkout stand with its associated equipment including the incoming conveyor belt and the figure also shows a packaging station and an outgoing conveyor belt interconnecting the checkout stand and the packaging station.

Before the conveyor start/stop arrangement proper is described in detail, a general description of the automatic checkout apparatus involved in the preferred embodiment will first be given with reference to FIGS. 1-3 and 6. In FIGS. 1-3 the checkout stand as a whole is designated as 1 and the incoming conveyor belt as 3. This belt serves to transport product items, such as package 7, which have been placed by the customer on the left end, FIGS. 1 and 2, of the belt to the right-hand terminating or delivery end of the belt which is marked by plane 8 in which the light source LS and the photopickup PP are disposed. Light scanner LS and photopickup PP which form part of the scanning equipment used in connection with the start/stop arrangement of the present invention may, for instance, be located in the two opposing side rails 9 between which the belt 3 moves.

As shown in FIG. 3, under normal conditions the light beam projected along the dot-dash line strikes the photopickup PP. However, when product 7 arrives at the delivery end of the belt as indicated by the broken-line representation 7', FIG. 2, of the product in that position, the light beam is interrupted and this interruption is sensed by the photopickup. The ultimate result of the sensing action is that the normally operative circuit for the drive motor 6 of belt 3 is opened in a manner explained in detail hereinafter so that drive roller 5 of the belt and, along with it, belt 3 itself, as well as roller 4 at the other end of the belt, are stopped. It will be understood, of course, that the drive motor 6 need not necessarily be mounted coaxially with the shaft of drive roller 5 but could instead be coupled to the shaft of roller 4 or 5 by a transmission belt or the like.

With belt 3 stopped, the checkout clerk now lifts the product from the belt so that, as shown in FIG. 3 the light beam again impinges on photopickup PP, with the result, described further below, that the belt again resumes its operation. The checkout clerk now moves the product, generally from left to right as viewed in FIG. 3, past the rectangular window 11 in the top surface 2 of checkout counter 1 to enable the scanner 12 to scan the label 13, affixed to, or forming a part of, the underside of product 7 to be scanned by the scanner through window 11. As shown in FIGS. 1 and 2, the scanner is built into checkout counter 1 underneath its top surface 2. Scanning equipment which can be used for this purpose is known in the art and hence requires no detailed description. Suffice it to say that this automatic scanning operation is typically carried out by one or more scanning laser beams projected upwardly by the scanner through an opening such as window 11; and that the identifying information on the product, or on label 13 attached thereto, may be encoded thereon in bar code format, and preferably in the format of the Universal Products Code (UPC) which consists of multiple parallel lines of varying width and which has been adopted as a standard for use in automated checkstands in grocery stores in the United States.

Figure 6:
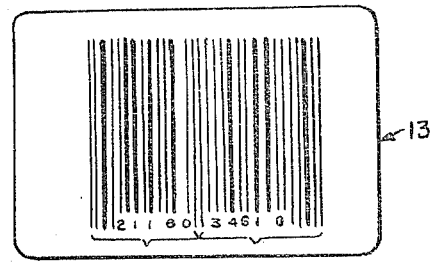
FIG. 6 shows a typical product label using the Universal Product Code.

A thus encoded label 13 has been shown, by way of example, in FIG. 6. The code shown there identifies the product by manufacturer and brand in the first five digits and the specific item in the last five digits. It should be noted that scanners with an omnidirectional reading capability are available in the art, such that UPC-encoded labels of the general type shown in FIG. 6 can be read by the scanner even if the surface of the label or the package is not entirely parallel to the surface 2 of the counter. Also the label need not necessarily be attached to the bottom surface of the package as long as the label is moved by the clerk past window 11 within the scanning field of the scanner.

Figure 4:
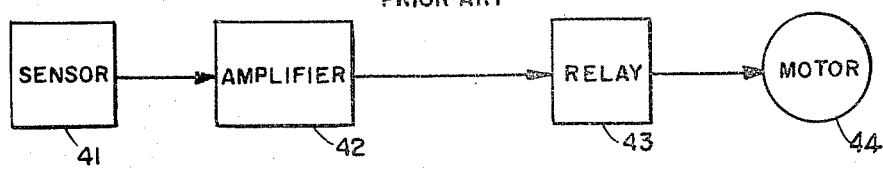
FIG. 4 is a simplified block diagram schematically showing the start/stop control for the conveyor motor according to the prior art.

As will be seen from FIG. 4, the checkout counter has an extension 10 on which there are mounted a keyboard 31, a visual display unit or monitor screen 32 and a tape printer 33. In the operation of this computerized checkout system, the code on the label, upon being read by the scanner is sent to the store computer (not shown) for identification. This computer searches its memory for the current retail price of the item scanned, which price has earlier been written into this memory. The store computer then sends the information back to the checkout counter where the price information and the abbreviation identification of the product are visually displayed on monitor screen 32 and are printed by tape printer 33 on the receipt tape, within a fraction of a second. In this fashion, the customer can readily verify the identity of the price of the product, and, in addition, he will receive on his itemized receipt a permanent printout of the product's description and price to help him compare prices between shopping trips. The system can also be designed to keep record of taxes, food stamps, deposits, coupons, totals, and change due. Keyboard 31 can be used by the checkout clerk, for example, to key up information relating to product items, which, for one reason or another, cannot be provided with an encoded label.

The package area shown on the right-hand portion of FIG. 3 will be described at a later point of the specification.

Figure 5:
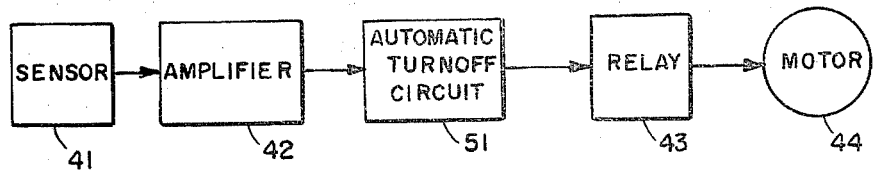
FIG. 5 is a simplified block diagram schematically showing the motor start/stop control with the inclusion of the automatic turnoff circuit according to the invention.

Returning now to the conveyor start/stop apparatus proper, the arrangement that has heretofor been used for this purpose has schematically been illustrated in FIG. 4. As shown in this figure, a photoelectric conveyor control as typically used in the prior art, consists of a photoelectric sensor 41 which, by way of an amplifier 42, directly drives a relay 43 controlling the conveyor motor 44. FIG. 5 schematically shows the arrangement according to the invention in which an automatic turnoff or "energy saver" circuit 51 has been interposed between the amplifier 42 and the relay 43 so that the amplifier drives the automatic turnoff 51 51 and the latter in turn drives the motor control relay 43.

Figure 7:
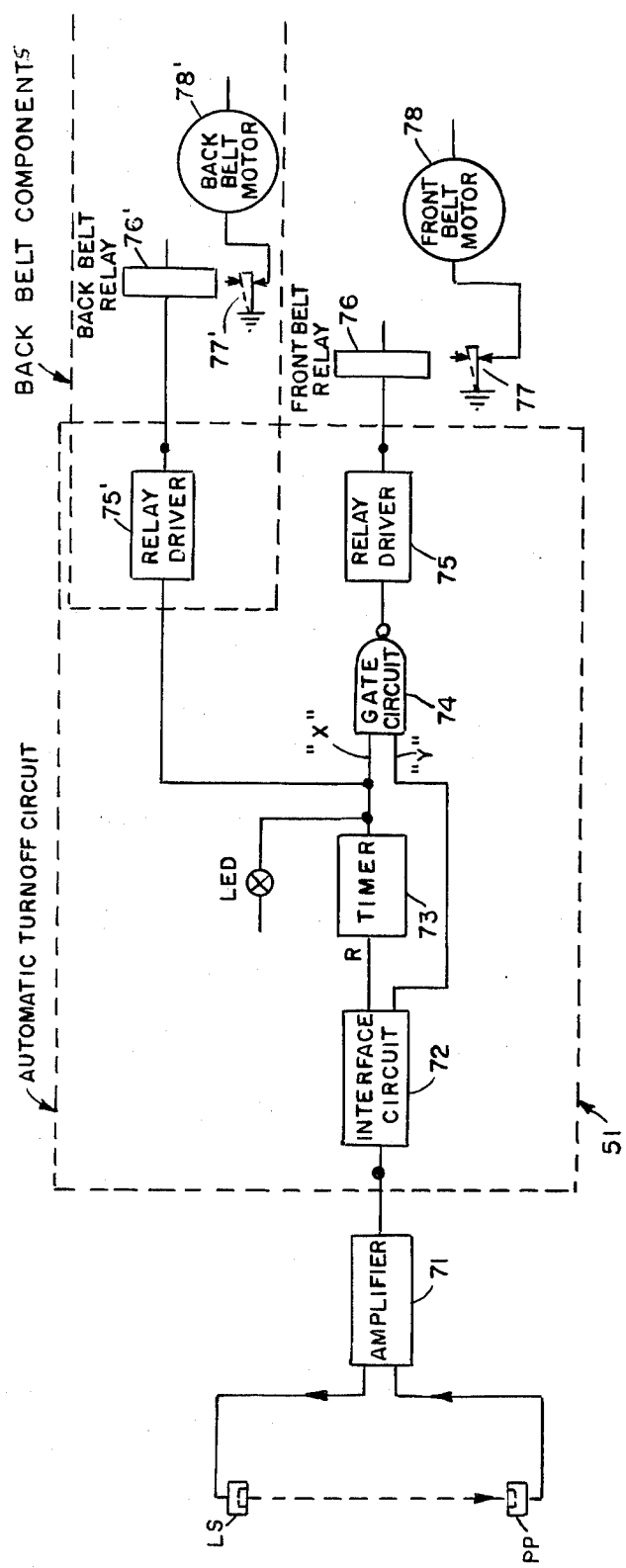
FIG. 7 is a schematic diagram showing the start/stop control of FIG. 5 in greater detail and also indicating the additional components required if the starting and stopping of an outgoing belt is also desired.

In FIG. 7, the control arrangement of FIG. 5 has been shown in greater detail except that for simplicity's sake, the required power supply has been omitted in FIG. 7 the same as in FIGS. 4 and 6. As will be seen from FIG. 7, the light source LS, as a matter of convenience, is powered from the power supply (not shown) through the medium of amplifier unit 71 while the output of photopickup PP—which corresponds to block 41, labeled "sensor" there—is connected to the input of amplifier 71 proper. It may be noted here in passing that instead of a light beam a beam of radiation of other kind could also be used for the detection of the items, such as product 7, conveyed by the belt.

As shown in FIG. 7, automatic turnoff or "energy saver" circuit 51, consists primarily of an interface circuit 72, a timer circuit 73, a gating circuit 74 and a relay driver circuit 75. Interface circuit 72 has its input connected to the output of the amplifier and it has two outputs, one of which is connected to the reset output R of the timer while the other is directly connected to the lower input "Y", FIG. 7, of the gate circuit. The output of the timer is connected to the upper input "X" of the gate circuit and it is also connected to light emitting diode LED which is lit whenever the timer has completed its cycle.

Gate 74 is a NAND gate, that is the output of this gate is true if at least one of its inputs is false, and the output of the gate is false if all of its inputs are true. As a result, if the gate receives no inhibiting signal either from the timer (by way of conductor "X") or directly from the amplifier (by way of conductor "Y"), that is, if both of these inputs to the gate are true, then the NAND gate provides no output, that is the relay driver is not conditioned to operate rely 76, and consequently, conveyor motor 78 is operating. On the other hand, if either the timer, for want of reset signals being applied to its R input, for a predetermined length of time, is given a chance to provide, upon completion of its cycle an inhibiting signal, or if the lower output of the interface circuit provides an inhibiting signal in direct response to the interruption of the light beam by a product, that is if either the "Y" or the "X" input to the NAND gate becomes false, then the NAND gate has an output and hence the relay driver is conditioned to operate relay 76 and, as a consequence, conveyor motor 78 is stopped.

In light of the foregoing, the overall operation of the start/stop arrangement according to the present embodiment of the invention, can best be described by reference to table A, as follows:

Under normal operation conditions no product is viewed by the sensor, and thus the timer runs, the relay is released and the motor is operating. Now, when a product is viewed by the scanner, the timer is reset, the relay is operated due to gate 74 receiving a signal via its input Y, and the motor is not operating. Subsequently, when the product is removed by the clerk from the path of the light beam, the timer is again allowed to run, the relay is released and the motor is operating. The foregoing cycle of operation repeats itself each time a product arrives at the delivery end of the belt and is then removed from the belt by the clerk prior to being checked out. However, when the "traffic" of arriving products, becomes slack, and, as a result no product is viewed by the sensor for a predetermined time, say three minutes, then the timer is permitted to complete its cycle, the relay operates due to gate 74 receiving a signal via its input X and hence, the belt motor is stopped.

If a new demand for the conveyor belt arises, the checkout clerk manually interrupts the light beam, for example, by passing her hand or the divider bar—normally used by her for separating the products of different customers from each other on the belt—through the light beam to momentarily interrupt the latter, and hence the timer is reset, the relay is operated and the conveyor motor is stopped. When, immediately thereafter, the clerk's hand or her divider bar, moves out of the path of the light beam so that the latter impinges again on photopickup PP, the timer is again allowed to run, the relay is released and the conveyor motor restarted, and in this manner the control arrangement has been restored to its normal condition shown in the top row of the table. The interruption of the light beam by the clerk could, of course, also be simulated by a push button which could, for example, be interposed in the connection bewteen photopickup PP and the input of the amplifier and which, upon actuation, would momentarily open this connection at a break contact.

TABLE A

| Condition at Sensing Point | Timer 73 | Relay 76 | Conveyor Motor 78 |
|---|---|---|---|
| No Product Viewed by Sensor | Runs | Released | Operating |
| Product Viewed by Sensor | Reset | Operated (via "Y") | Not Operating |
| Product Removed from Beam Path by Clerk | Runs | Released | Operating |
| No Product Viewed by Sensor for Predetermined Time | Completes Cycle | Operated (via "X") | Not Operating |
| Clerk Interrupts Light Beam Manually | Reset | Operated (via "Y") | Not Operating |
| Clerk's Hand Moves out of Light Beam | Runs | Released | Operating |

It will be appreciated then that with the control circuit of FIG. 7 the waste of electrical energy during slack periods is automatically eliminated, and by the same token, the wear and tear on the incoming belt 3 and its associated equipment greatly reduced.

In FIG. 7 the motor designated 78 has been assumed to be the motor driving the "incoming belt" or "front belt" 3, FIGS. 1 to 3, which conveys the grocery products in the direction toward the checkout stand. In FIG. 3 another belt, 23, has been shown which leads away from the checkout stand and, more particularly, interconnects the checkout stand with a separate, more or less remote packaging area 21 when provided. As illustrated in FIG. 3, this "outgoing belt" or "back belt" is driven by a separate motor 27 which in FIG. 3 has been assumed to be mounted on the axis 25 of the driving roller (not shown) of this belt. An idling roller, also not shown, is mounted for rotation about axis 26 at the near end of the belt. After the clerk has checked out a product, she places it on the near end of back belt 23, for example, by way of an inclined plane 24 at that end so that the items finally line up on the working surface 22 of the packaging area, as indicated at 28. Another clerk then places the items into the bag such as 30 which is shown in FIG. 3 as resting on a shelf 29. While in FIG. 3 only one such back belt has been shown leading to the packaging area it is also possible to provide a larger packaging area serving a plurality of checkout stands in common. In such a case the various checkout stands would be interconnected with the common packaging area by respective separate back belts and these belts could be disposed substantially parallel to each other.

The start/stop control circuit of FIG. 7 indicates in the dot-dash rectangular box how back belt motor 78', corresponding to motor 27 as physically shown in FIG. 3, can be automatically controlled through the medium of the automatic turn-off circuit so that the—normally operating—back belt motor is stopped upon detection of a low traffic situation, that is when no product has arrived at the terminating end of incoming belt 3 within a predetermined time such as 3 minutes. To this end another relay driver 75' is connected, along with input "X" of gate circuit 74, to the output of timer 73 only. In this fashion, when the timer has a chance to complete its timing cycle, relay driver 75' is conditioned to operate back belt relay 76' which at its break contact 77' opens the circuit of back belt motor 78', thereby stopping back belt 23, FIG. 3. Subsequently, when the checkout clerk upon resumption of belt demand, runs her hand or divider bar through the light beam as explained, the resulting resetting of the timer, in nullifying the timer output signal, immediately causes back belt relay 76' to be released and hence permits back belt 23 to resume its operation. Thus unnecessary wear and tear on the back belt, as well as the corresponding unnecessary consumption of energy is likewise automatically avoided in a simple and inexpensive manner.

Figure 8:
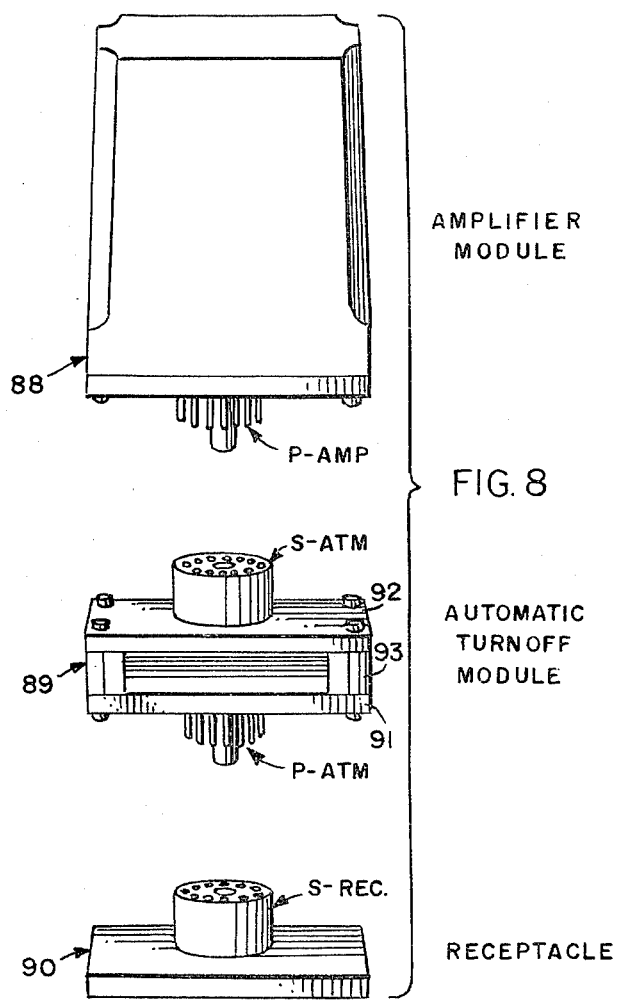
FIG. 8 is a perspective exploded view of a combination of plug-in modules, including an automatic turnoff module according to the invention.

A particularly advantageous physical embodiment of the control arrangement according to the present invention is illustrated in FIG. 8 where the automatic turn-off circuit is shown implemented as an accessory unit, in the form of a plug-in module 89 having a multi-pin plug P-ATM on one side and a multi-element socket S-ATM on the other side. Plug P-ATM is mounted on a base 91 on the opposite side of which there is mounted, by way of spacers 93, a printed circuit card 92 carrying the various electrical components of the turn-off circuit. Also mounted on this printed circuit card 92 is the aforementioned socket S-ATM.

In order to provide the prior art operation schematically shown in FIG. 4, the amplifier module 88, FIG. 8, provided as shown there, with multi-pin plug P-AMP, is plugged directly into multi-element socket S-REC of receptacle 90 through which access is provided to the outside connections (not shown in FIG. 8). However, if the operation according to the invention and schematically illustrated in FIG. 5 is desired, then automatic turn-off module 89 is interposed, that is plug P-ATM of automatic turn-off module 89 is plugged into socket S-REC of receptacle 91 and plug P-AMP of amplifier module 88 in turn is plugged into socket S-ATM of automatic turn-off module 89.

In order to make these alternative kinds of operation possible, the outside circuit connections required by amplifier 88, such as those leading to light source LS and photo pick-up PP of the sensing equipment and also the connections to the source of power supply, are carried through corresponding male pins and female elements of plug P-ATM and socket S-ATM of module 89 in series, as shown in FIG. 9. As will also be seen from FIG. 9, when automatic turn-off module is not used, amplifier output terminal AMP-OUT, is, upon plugging in of the amplifier module, directly connected to the receptacle terminal leading to the relay winding. On the other hand, if automatic turn-off module 89 is used, then terminal AMP-OUT becomes connected to the input terminal of module 89 and the output terminal of this module becomes connected to the receptacle connection leading to the relay winding.

FIG. 9, moreover, shows further details of the automatic turn-off circuit. As will be noted from FIG. 9, module 89 mounts two integrated circuits, one of these being the timer 73 and the other, designated 87, containing the components 83 through 86 comprised by interface circuit 72 and gate circuit 74, FIG. 7. As will also be seen from FIG. 9, the timer has associated therewith a timer adjusting circuit 82 made up of a potentiometer and a transistor 71, as well as related components, and relay driver circuit 75 includes transistors T2 and T3 in a well-known circuit configuration. In addition, module 89, FIG. 5, mounts a 15 volt regulator circuit the input of which is connected to the power supply bus bars plus 15 V and ground and the output of which furnishes a regulated plus 15 V supply. Terminal C, FIG. 9, may be strapped to terminal A or B, and terminal F may be strapped to terminal D or E, to provide a corresponding phase reversal of the signal sent to the relay driver circuit. Thus, relay 76, FIG. 7, may, in a manner known per se in the art, be converted from a normally released to a normally operated relay if this should be desired; in this case the motor would be connected to its make contact, rather than its brake contact as shown in FIG. 7. As will be noted, relay driver 75' shown in FIG. 7 for optional back belt control, has, for the sake of simplicity, been omitted in FIG. 9. The integrated circuits shown in FIG. 9 are commercially available as Type 555 of National Semiconductor Corporation for timer 73 and as Type 4011 of National Semiconductor Corporation for circuit 87.

Although the description of this invention has been given herein with reference to particular embodiments it is not to be construed in a limiting sense. Many variations and modifications will occur to those skilled in the art. For example, the starting and stopping of the conveyor need not necessarily be effected by means of an electric drive motor but it may be brought about, instead, with the aid of a controllable clutch or brake. Also, where the flexibility of the plug-in accessory arrangement described above in connection with FIGS. 8 and 9 is not needed, it is also possible to integrate the automatic turn-off control circuitry into the circuit of the sensor amplifier unit itself.

I claim:

1. In a checkout system for retail stores in which products upon arrival at the delivery end of a conveying means are removed by the checkout clerk, one by one, for check out,
   a start/stop arrangement for said conveying means,
   said arrangement including at said delivery end of the conveying means, a beam of radiation and sensing means cooperating with said beam for detecting the crossing of said beam by a product upon its arrival at said delivery end, and also including a start/stop control circuit connected to and controlled by said sensing means,
   said control circuit providing two alternative paths for controlling said conveying means from said sensing means, one of said paths being effective responsive to the detection by said sensing means of the arrival of a product at, and the removal of a product from, said point, for automatically, and substantially instantaneously, stopping and starting said conveying means, respectively, and the other of said paths including timing means and being effective responsive to no such product being detected by said sensing means within a predetermined time for automatically bringing about the delayed stopping of said conveying means.

2. In a checkout system the start/stop arrangement as claimed in claim 1, wherein said control circuit comprises amplifying means connected to said sensing means, switching means for automatically stopping the normally operating conveying means, and gating means interposed between said switching means and said amplifying means, said gating means having two input circuits, one of said input circuits bypassing, and the other of said input circuits including, said timing means.

3. In a checkout system the start/stop arrangement as claimed in claim 2,
  wherein said arrangement also includes a multi-pin receptacle providing for the connections to said switching means and to said sensing means, as well as the power supply connections for said control circuit,
  wherein said amplifying means is in the form of an amplifier unit equipped with a multi-pin plug for plug-in connection to said receptacle, and
  wherein said gating means and said timing means are included in an accessory unit having on one side thereof multi-pin plug means and on the opposite side thereof multi-pin jack means such that said accessory unit may be interposed between said receptacle and said amplifier unit so as to complete said start/stop control circuit.

4. In a checkout system for retail stores in which products bearing a coded label upon arrival at the delivery end of a conveying means are removed by the checkout clerk, one by one and caused to be scanned for the machine-identification of information pertaining to said products,
  a start/stop arrangement for said conveying means,
  said arrangement including at said delivery end of the conveying means, a beam of radiation and sensing means cooperating with said beam for detecting the crossing of said beam by a product upon its arrival at said delivery end, and also including a start/stop control circuit connected to and controlled by said sensing means,
  said control circuit providing two alternative paths for controlling said conveying means from said sensing means, one of said paths being effective responsive to the detection by said sensing means of the arrival of a product at, and the removal, prior to scanning, of a product from, said point, for automatically, and substantially instantaneously, stopping and starting said conveying means, respectively, and the other of said paths including timing means and being effective responsive to no such product being detected by said sensing means within a predetermined time for automatically bringing about the delayed stopping of said conveying means.

5. In an automatic checkout system a start/stop arrangement as claimed in claim 4,
  wherein said arrangement includes at said delivery point, a source of light producing a light beam, and sensing means for detecting the crossing of said light beam by a product upon its arrival at said delivery point.

6. In a material handling system comprising a conveying means,
  a start/stop arrangement for said means,
  said arrangement including, at a delivery point of said conveying means, a beam of radiation and a sensing means for detecting the crossing of said beam by an article of material upon its arrival at said delivery point, and also including a start/stop control circuit connected to and controlled by said sensing means,
  said control circuit comprising circuit means for automatically stopping said conveying means responsive to the detection by said sensing means of an item of material and also comprising timing means for automatically stopping said conveying means responsive to no such item being detected by said sensing means within a predetermined time, an amplifier unit connected to said sensing means, a conveyor control relay and, interconnected between said amplifier unit and said relay, an automatic turn-off circuit including said circuit means and said timing means,
  and said arrangement also including a multi-pin receptacle providing for the connections to said relay and to said sensing means, as well as the power supply connections for said control circuit,
  said amplifier unit being equipped with a multi-pin plug for plug-in connection to said receptacle, and
  said automatic turn-off circuit being in the form of an accessory unit having on one side thereof multi-pin plug means and on the opposite side thereof multi-pin jack means such that said accessory unit may be interposed between said receptacle and said amplifier unit so as to complete said start/stop control circuit, and said automatic turn-off circuit comprising
  an interface circuit having an input and two outputs, said input, upon plug-in, being connected to the output of said amplifier unit,
  a timer,
  a gate circuit having an output and two inputs, one input of said gate circuit being connected to one output of said interface circuit and said timer being interconnected between the other output of said interface circuit and the other input of said gate circuit, and
  a relay driver interconnected, upon plug-in, between the gate circuit output and the input of said control relay.

7. In a material handling system having a material transfer station and having a first normally operating conveyor means incoming at said transfer station and a second normally operating conveyor means outgoing from said transfer station to a distant location;
  a start/stop arrangement for said conveying means;
  said arrangement including, at the delivery end of said incoming conveying means, a beam of radiation and a sensing means cooperating with said beam to detect the crossing of said beam by an item of material upon its arrival at said delivery end, and also including a start/stop control circuit connected to and controlled by said sensing means,
  said control circuit providing two alternative paths for controlling said conveying means from said sensing means, one of said paths being effective responsive to the detection by said sensing means of the arrival of a product at, and the removal, incident to the transfer, of a product from, said point, for automatically, and substantially instantaneously, stopping and starting said conveying means, respectively, and the other of said paths including timing means and being effective responsive to no such product being detected by said sensing means within a predetermined time for automatically bringing about the delayed stopping of said conveying means.

8. In an automated checkout system for retail stores which comprises a checkout station and a packaging station, a first conveying means incoming to said checkout station and a second conveying means outgoing from said checkout station to said packaging station, and in which products bearing a coded label, upon arrival at the delivery end of said incoming conveying means, are removed by the checkout clerk from the incoming conveying means, moved by the clerk one by one, past the window of a scanner for the machine-identification of information pertaining to said products, and are then placed on said outgoing conveying means for transportion to said packaging station;

a start/stop arrangement for said conveying means, said arrangement including, at said delivery end of the incoming conveying means, a beam of radiation and a sensing means cooperating with said beam to detect the crossing of said beam by a product upon its arrival at said delivery end, and also including a start/stop control circuit connected to and controlled by said sensing means, said control circuit providing two alternative paths for controlling said conveying means from said sensing means, one of said paths being effective responsive to the detection by said sensing means of the arrival of a product at, and the removal of a product from, said point, for automatically, and substantially instantaneously, stopping and starting said incoming conveying means, respectively, and the other of said paths including timing means and being effective responsive to no such product being detected by said sensing means within a predetermined time for automatically bringing about the delayed stopping of said incoming and said outgoing conveying means.

\* \* \* \* \*